United States Patent [19]

McKee

[11] Patent Number: 4,647,110
[45] Date of Patent: Mar. 3, 1987

[54] UNITARY CARGO BIN AND TRACK ASSEMBLY

[76] Inventor: David J. McKee, 4435 Cavedale Rd., Glenellen, Calif. 95442

[21] Appl. No.: 524,962
[22] Filed: Aug. 19, 1983
[51] Int. Cl.$^4$ ............................................. B60P 1/32
[52] U.S. Cl. ................................... 298/1 A; 298/12; 414/477; 414/534
[58] Field of Search .......................... 298/1 A, 14, 12; 414/477, 529, 532, 533, 534, 535, 478, 479

[56] References Cited

U.S. PATENT DOCUMENTS

| | | | |
|---|---|---|---|
| 2,370,489 | 2/1945 | Reed | 298/14 |
| 3,001,825 | 9/1961 | Rouse | 298/12 X |
| 3,297,182 | 1/1967 | Barry | 414/728 X |
| 3,768,673 | 10/1973 | Nydam et al. | 298/1 A |
| 3,915,496 | 10/1975 | Mabry, Jr. | 298/14 |
| 4,084,851 | 4/1978 | Duncan, Sr. | 298/14 |
| 4,126,357 | 11/1978 | Day | 298/1 A |
| 4,139,236 | 2/1979 | Hill et al. | 298/14 |

Primary Examiner—Robert J. Spar
Assistant Examiner—Janice Krizek
Attorney, Agent, or Firm—Townsend and Townsend

[57] ABSTRACT

A cargo retaining and dumping device for mounting to a load-bearing platform is disclosed, comprising a cargo bin slidably mounted through a retaining guide connection to a track which is bifurcated in the lengthwise direction, the rearmost portion of which is upwardly pivotable about its rear end.

6 Claims, 11 Drawing Figures

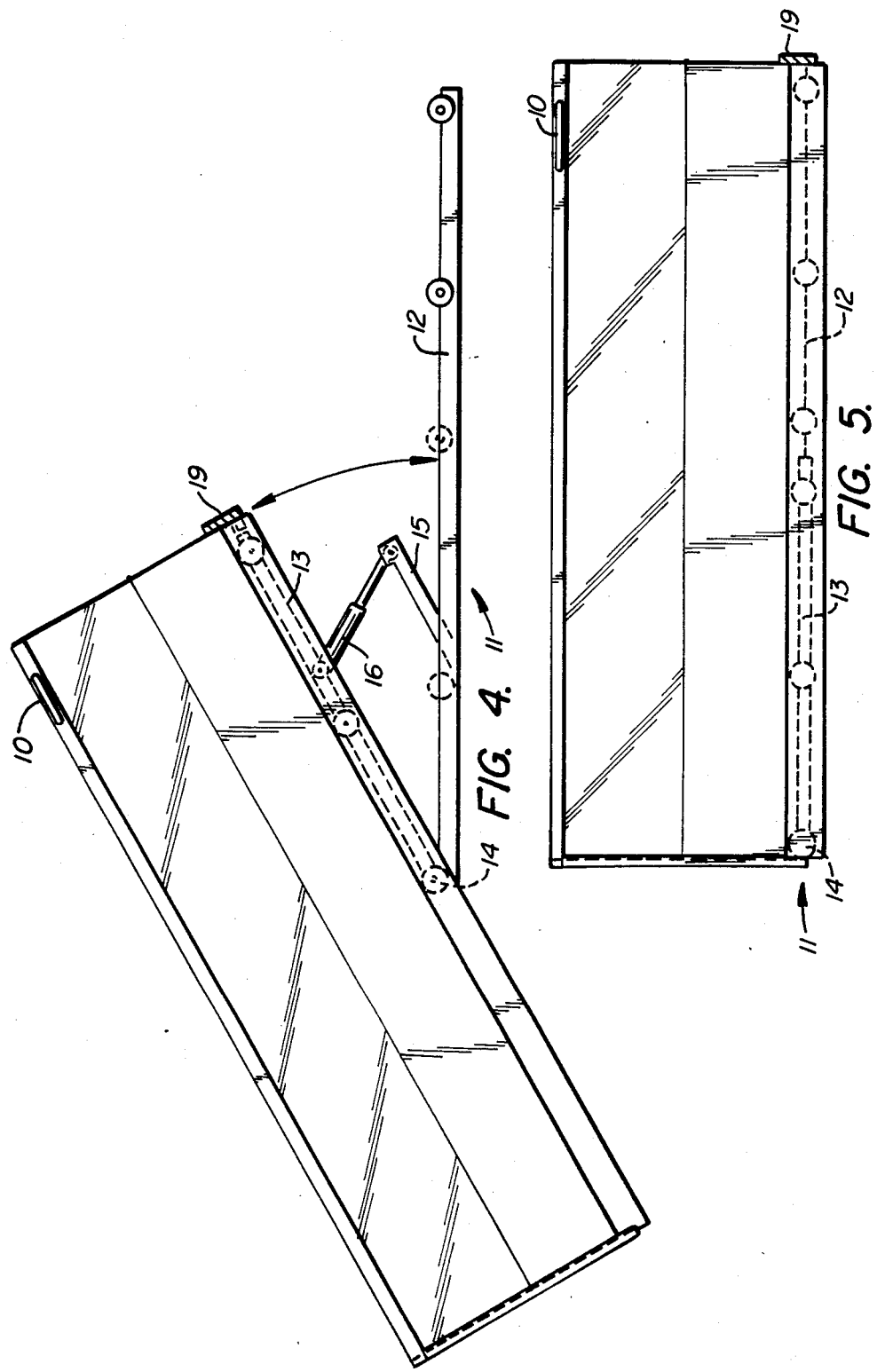

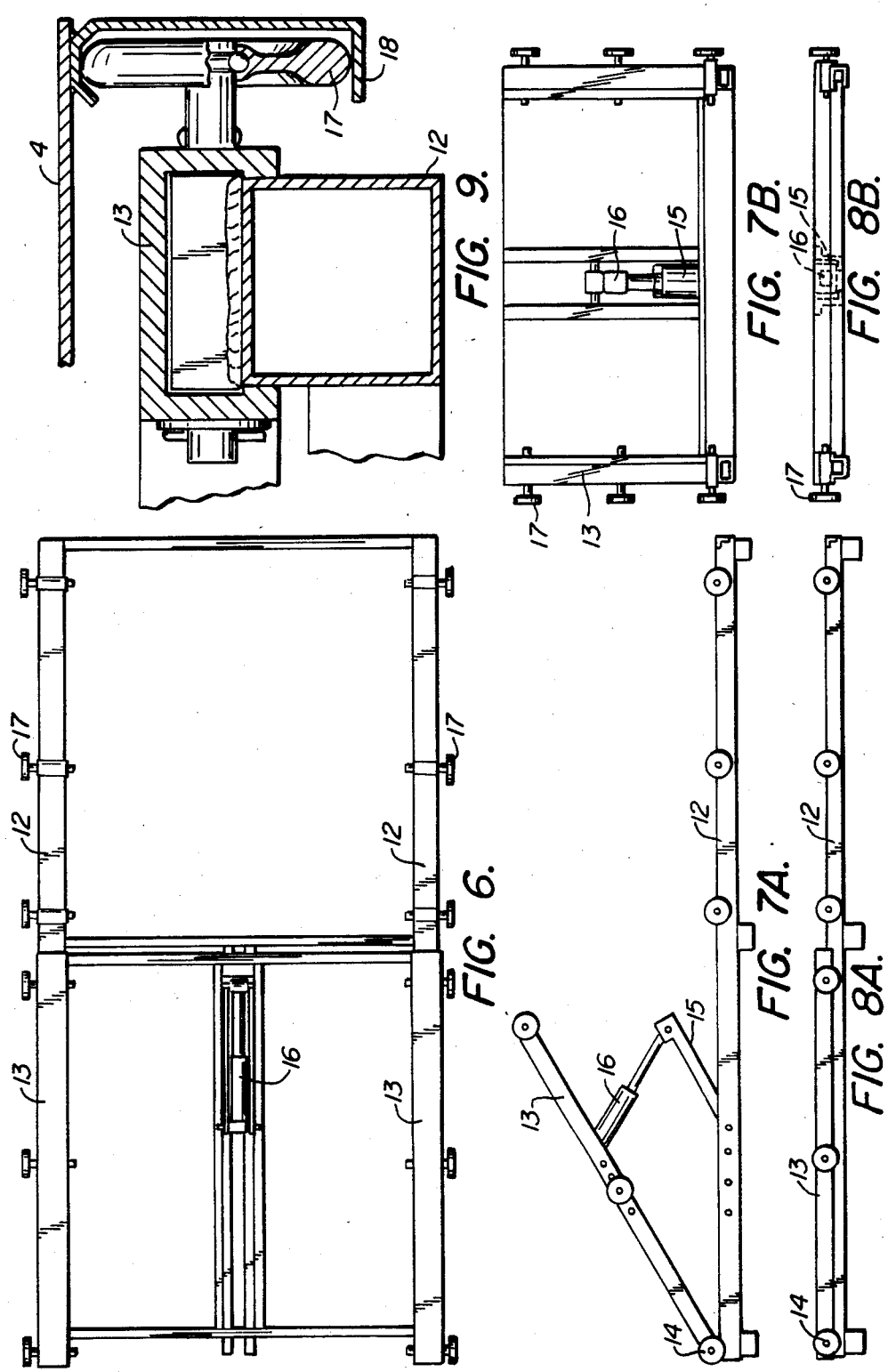

UNITARY CARGO BIN AND TRACK ASSEMBLY

BACKGROUND OF THE INVENTION

1. Field of the Invention

The present invention relates to the handling of bulk cargo on a load-bearing platform, and particularly to the loading, retention, and discharging of such cargo from the platform. The present invention resides in a dumping container assembly designed for attachment to an open-top load-bearing platform of a transport vehicle such as a pickup truck, trailer, or van.

2. Description of the Prior Art

Many vehicles, including commercial, recreational, and generally utilitarian vehicles, are supplied with a load-bearing platform suitable for supporting containers such as cargo bins or dump boxes. For maximum utility, the container must be securely attached in a stable and upright position during loading and transport yet capable of readily and easily discharging the cargo when desired. Many existing structures are capable of accommodating a substantial load, but once loaded are difficult to maneuver for discharging or dumping purposes. Existing designs for tilting containers which remain attached to the platform during discharge (or dumping) often require a substantial lifting force necessitating the use of hydraulic lifts or other cumbersome machinery and complex linkages. Supporting structures of this type are expensive and consume valuable platform space. In addition, such structures are not readily adaptable to many existing vehicles.

SUMMARY OF THE INVENTION

A novel cargo retaining device of simple yet versatile construction is provided which permits a high degree of control by simple manual operation during the full range of operation, including loading, retaining, and dumping. The structure consists of a cargo bin slidably mounted through a retaining connection on a track which is bifurcated in the lengthwise direction, the rearmost portion of which is upwardly pivotable about the rear end. The bin and track form a unitary structure which permits forward and backward travel of the cargo bin relative to the track, as well as a tilting of the cargo bin about an axis at a predetermined location along the length of the bin when the bin is in the extreme rearward position along the track. At all points along the path of travel or degree of tilt, the bin remains engaged with the track. The structure is readily mounted on an existing load-bearing body or platform, or the load-carrying space of a light truck, trailer, van, or similar vehicle. The result is a simple yet versatile construction with a minimum of moving parts, yet permitting manual operation with a high degree of control.

BRIEF DESCRIPTION OF THE DRAWINGS

FIG. 4 is a side view of the cargo bin and track assembly shown in FIG. 1, in the dumping or discharging position.

FIG. 5 is a side view of the cargo bin and track assembly of FIG. 1 in the forward position.

FIG. 6 is a top view of the track element of the embodiment of FIG. 1, with the movable portion of the track in its lowered position.

FIGS. 7a and 7b are a side view and end view, respectively, of the track shown in FIG. 6, demonstrating the raised position of the movable portion.

FIGS. 8a and 8b are side and end views, respectively, of the track shown in FIG. 6, with the movable portion in the lowered position.

FIG. 9 is a rear view of one end of the track system shown in FIG. 6, demonstrating the movable portion in its lowered position.

DESCRIPTION OF THE SPECIFIC AND PREFERRED EMBODIMENTS

The following is offered to demonstrate the structure and function of the various components of the invention in a variety of illustrative embodiments, with particular reference to the embodiment shown in the attached drawings.

Figure 1:
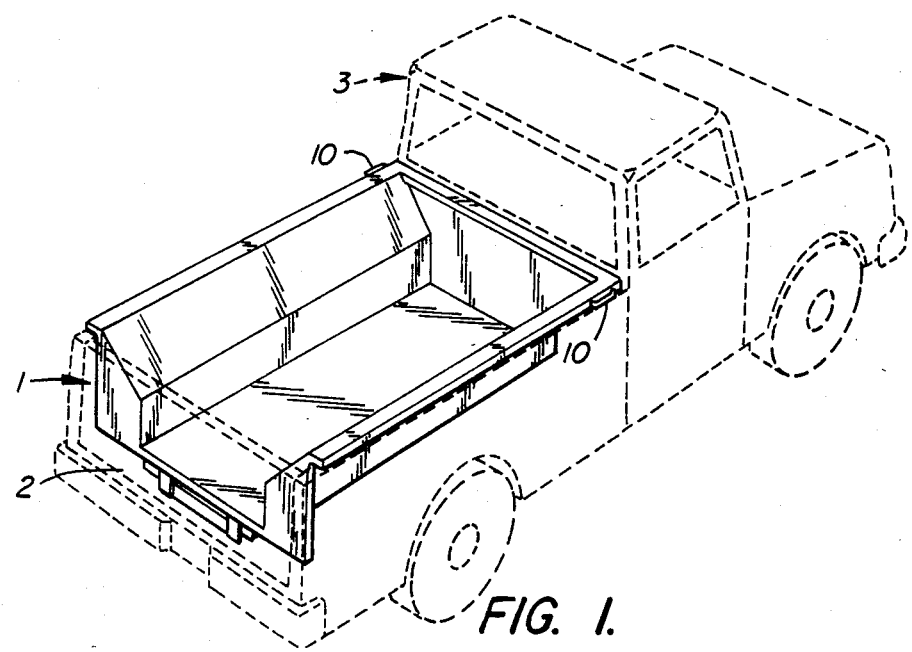
FIG. 1 is a perspective view of one embodiment of the present invention, shown mounted to the bed of a pickup truck and in the loading or transporting position.
Figure 2:
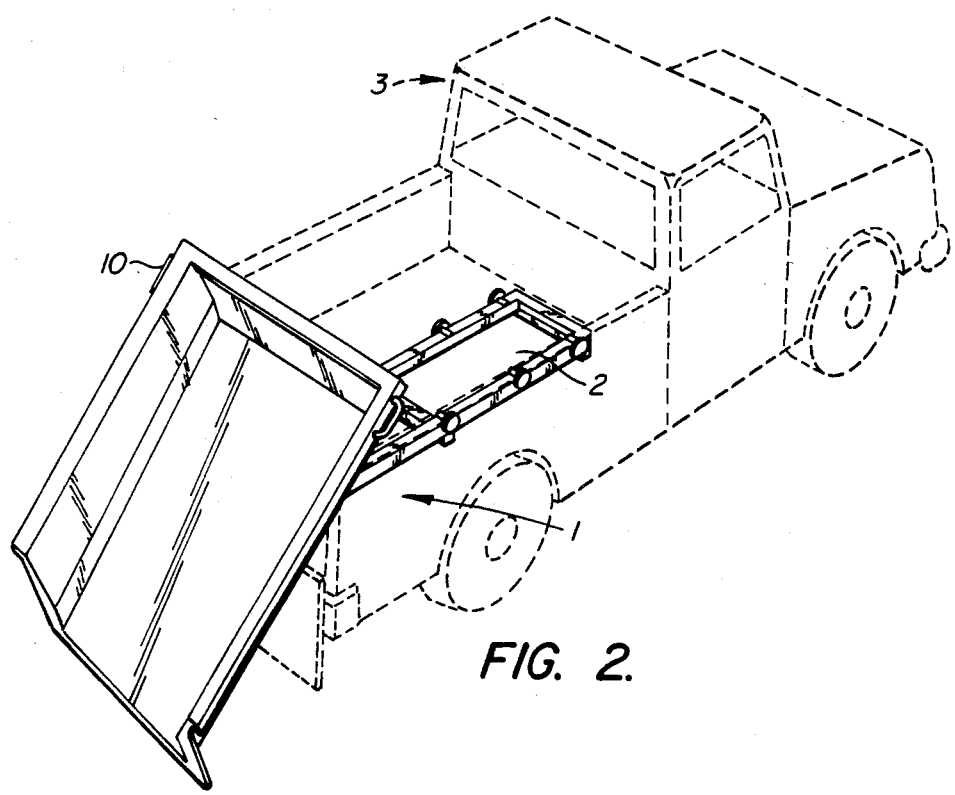
FIG. 2 is a perspective view of the embodiment of FIG. 1 in the dumping or discharging position.

FIGS. 1 and 2 illustrate the cargo bin and track assembly of the invention as it might be mounted on the rear of a pickup truck in the loading/retaining and dumping positions, respectively. The bin and track assembly is designated by the numeral 1, the load-bearing platform 2 and the truck 3.

Figure 3:
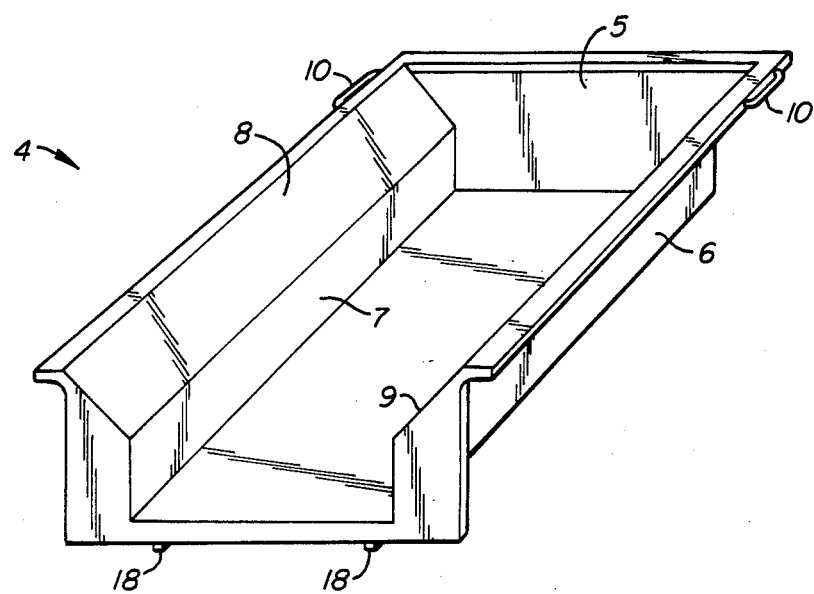
FIG. 3 is a perspective view of the cargo bin element of the embodiment shown in FIG. 1.

FIG. 3 illustrates the cargo bin 4 itself. The bin is an open-top container which may be any of a wide variety of shapes and sizes capable of retaining cargo when mounted on the platform yet capable of being pushed backward and forward along the track in a continuous manner. For most platforms, a bin substantially rectangular in shape and enclosed on at least three sides will be the most convenient. In the drawing, the enclosed sides are the forward end 5 and the two lateral sides 6 and 7. Enclosure of the bin on the fourth or rear side for retaining the cargo during motion of the vehicle may be supplied by either the bin itself or the vehicle on which the bin assembly is mounted. In the embodiment shown in FIGS. 1 and 2, fourth side enclosure is supplied by the vehicle, i.e., the tailgate of the truck prevents the cargo from falling out.

In embodiments where the bin has its own rear end enclosure, the shape of the enclosure is not critical provided that it permits dumping of the cargo when the bin is tilted. Thus, a variety of designs may be incorporated, including an open back end, a back end closed by a swinging door or set of doors, and a slanted back end. As an illustration of the latter, the floor of the bin is slanted at the rear so that the cargo is prevented from falling out while the bin is in the loading or transporting position, yet the slant angle is selected such that the slanted portion of the floor is approximately horizontal when the bin is tilted for dumping purposes. This design is particularly useful for vehicles which lack a tailgate or for types of cargo where minimal loss is desired.

The bin 4 shown in FIGS. 1, 2 and 3 is specifically shaped for pickup truck beds or similar load-bearing platforms on which rear wheel shields or similar obstructions extend upward at the sides. To prevent these shields from interfering with the forward and backward motion of the bin, the bin is narrower at the base, with the upper portions 8 and 9 of the bin sidewalls sloping inward. Handles 10 or similar means are mounted directly on the bin to permit one to manually grip the bin and thereby guide its position and motion.

The track portion of the structure is shown in FIGS. 4 and 5 in engagement with the cargo bin, and alone in FIGS. 6, 7a, 7b, 8a, and 8b, and is designated by the numeral 11. The track is bifurcated to form two sections, a fixed forward portion 12 and a pivoting rear portion 13. The latter pivots around an axis 14 at or near the rear end of the truck, perpendicular to the direction of travel of the bin along the track.

When the movable portion 13 of the track is in its lowered position, as shown in FIGS. 1, 5, 6, 8a, and 8b, it combines with the fixed portion 12 to form a continuous sliding connection running the entire length of the track. In preferred embodiments of the invention, the total length of the track is approximately equal to the length of the bin base. When the bin has traveled sufficiently far toward the rear of the track to be clear of the fixed portion 12, the pivot connection permits the movable portion 13 of the track to be raised, thus tilting the bin downward toward the rear. In preferred constructions, the rearmost edge of the bin will be below the level of the supporting platform when the movable portion of the track is raised to its utmost height.

In the embodiment shown, the pivoting angle of the movable portion of the track is limited by a hinged arm 15. In preferred constructions, the lower half of the hinged arm is limited in its degree of rotation to a maximum acute angle above the track frame, as shown in FIGS. 4 and 7a, to prevent locking or jamming the movable track portion 13 in an upraised position. In addition, control of the tilting rate as well as further control of the bin motion may be supplied by conventional means such as a shock-absorbing device, exemplified in FIGS. 4 and 7a as a piston and chamber arrangement 16. Once the lower portion of the hinged arm is raised to its maximum height, the piston device 16 controls the further rate of tilting due to the flow limitations on the fluid or air within the piston chamber. The limit of the piston extension in the chamber defines the maximum tilting angle of the movable portion 13 of the track. The piston device thereby enhances one's control of the track while the track is being lifted or lowered. This is particularly useful during the handling of heavy loads.

As shown in FIG. 6, the lower portion of the hinged arm 15 may be U-shaped to accommodate the piston chamber. This permits a full flattening of the track frame when the movable portion 13 of the track is in the lowered position. This is useful in providing a smooth continuous path of travel for the bin along the track, and making maximum use of the available cargo space on the load-bearing platform.

The track 11 itself may assume any configuration capable of retaining the bin in contact therewith for its entire length of travel. In preferred constructions, the track further provides a stable support for the bin, avoiding lateral tipping. Any configuration ranging from a single rail to a plurality of rails which serve this function will suffice.

A particularly convenient design is that consisting of a pair of parallel rails, as shown in FIG. 6.

A sliding connection between the track and the bin prevents disengagement of the bin from the track, yet permits travel of the bin along the length of the track. The connection may assume any conventional design which both locks the bin to the track yet permits travel in both directions. Examples include a slide-in-sleeve connection, ball or roller bearings and the like. Other suitable configurations will be readily apparent to those skilled in the art.

In the embodiment shown in the drawings, the sliding connection is formed by a series of rollers 17 and C-shaped channels 18. The locking effect is achieved by mounting the channels to face in opposite directions, with the rollers positioned accordingly. Motion of the bin in any direction other than along the track is thus prevented, and only when the bin clears the fixed portion of the track can the movable portion be lifted upward by tilting the bin. The rollers may be on the bin and the channels on the track, or vice versa. The former construction is shown in the drawing in FIG. 9, wherein the rollers are welded to the truck, extending outward, and the channels are welded to the base of the bin, opening inwards.

When the bin is in the forward position as shown in FIGS. 1 and 5, the channels 18 at the base of the bin engage all of the rollers 17 along the entire length of the track. The bin is thus locked in the horizontal position by the forwardmost rollers on the fixed portion 12 of the track. This also locks the movable portion 13 of the track in its lowered (horizontal) position. Tilting of the bin is permissible only when the bin has traveled sufficiently to the rear of the platform that the channels 18 clear the rollers on the fixed portion of the track.

In preferred structures within the scope of the invention, a stopping device is included to limit the rearward motion of the bin, preventing it from sliding off the track entirely. An example of such a device is a protruding lip 19 as shown in FIG. 4, extending downward from the forward outer wall of the bin, to abut the forward edge of the movable portion of the track frame as the bin travels toward the rear.

The rearmost position of the bin with respect to the track will be defined by the relative lengths of the movable portion 13 and the fixed portion 12, as well as the location of the stop 19. These will further define the point along the length of the bin which serves as the pivot axis during the dumping operation. The actual position of the bin at its rearward limit of travel is not critical, and the pivot axis may be at any point along the length of the bin base. In preferred embodiments, this point is approximately midway along the length of the base, to enhance the ease of manipulating the bin during and after dumping. When the track and bin are of approximately equal length, the movable portion of the track when lowered will be approximately half the length of the entire track. Further control of the bin is achieved by placing the rearmost roller of the fixed portion of the track 12 close to the forward end of the movable portion 13 so that the bin can be tilted only when it has travelled essentially as far back as the stop 19 will permit.

In an alternative structure to that shown in the drawings, a hand-operated winch may be installed to drive the bin backward along the track from the forwardmost or loading position to the rearmost position for tilting. This will be particularly useful for heavy loads. The position and operation of the winch may vary considerably. As one example, the winch may consist of a cable with one end fixed to the center of the forward cross-member of the frame supporting the movable portion of the track, and a ratcheted wheel attached to the front end of the bin. The cable may then run from the cross-member along the underside of the bin toward the front end and then upward to encircle the wheel drum. The wheel in turn may be connected to an elongated rod extending toward the side of the bin, terminating in a handle which can be operated manually. By turning the handle, one can rotate the ratcheted wheel and draw the cable upward and around the wheel drum, thereby forcing the bin forward. Other arrangements will be readily apparent to those skilled in the art.

The materials of construction are not critical. Any conventional, durable, material may be used. A convenient material is mild steel.

The assembly of the present invention is useful and suitable for mounting on any load-bearing platform, whether or not such platform is part of a moving vehicle, provided that the platform is raised above ground level and requires unloading to a level below the platform level. Thus, the assembly may be used on stationary loading platforms, as well as flatbed vehicles. Examples of the latter are trucks, vans, trailers, etc.

The foregoing description is offered for illustrative purposes only. The invention is not intended to be limited to the particular features of construction and operation shown and described. Numerous modifications and variations of the above which still fall within the spirit and scope of the invention as claimed hereinbelow will be readily apparent to those skilled in the art.

What is claimed is:

1. Apparatus for retaining cargo on and discharging cargo from a load-bearing platform, said apparatus comprising:
   a cargo bin;
   a pair of parallel rails each of length approximately equal to the length of said cargo bin and each comprising a fixed forward portion and a pivotal rear portion having a pivot axis at the rear end thereof, said cargo bin overlying the entire length of said rails when said cargo bin is in a horizontal load bearing position;
   a row of rollers affixed to each said rail with their axes transverse thereto, each said row including rollers affixed to said fixed forward portion and to said pivotal rear portion;
   a pair of C-shaped channels affixed to the underside of said cargo bin, each said C-shaped channel opening laterally and adapted to accommodate one said row of rollers and to prevent lateral disengagement thereof; and
   means for limiting the rearward travel of said cargo bin at a second position at which said C-shaped channels have cleared the rollers affixed to said fixed forward portion but are still in engagement with the rollers affixed to said pivotal rear portion.

2. Apparatus according to claim 1 in which said second position is that at which the center of gravity of said bin is approximately aligned vertically with said pivot axis.

3. Apparatus according to claim 1 further comprising means for limiting the angle of pivot of said pivotal rear portion.

4. Apparatus according to claim 1 further comprising means for damping the rate at which said pivotal rear portion is pivoted.

5. Apparatus according to claim 4 in which said damping means is comprised of a piston and chamber.

6. A flatbed vehicle having attached to the bed thereof a cargo retaining and discharging apparatus according to claim 1.

* * * * *